United States Patent [19]

Oaks

[11] Patent Number: 4,570,731
[45] Date of Patent: Feb. 18, 1986

[54] CONTROLLABLE GOLF BAG CART

[76] Inventor: Del Oaks, 2599 N. River Rd., Warren, Ohio 44483

[21] Appl. No.: 530,720

[22] Filed: Sep. 9, 1983

[51] Int. Cl.[4] .............................................. B62D 51/04
[52] U.S. Cl. .............................. 180/19.3; 280/DIG. 5
[58] Field of Search ........................... 180/19.1, 19.3; 280/DIG. 5

[56] References Cited

U.S. PATENT DOCUMENTS 3,948,332  4/1976  Tyner ................................. 180/19.1
3,989,116  11/1976 Hirano ........................... 280/DIG. 5
4,105,084  8/1978  Baak ................................... 180/19.1

Primary Examiner—Joseph F. Peters, Jr.
Assistant Examiner—Donn McGiehan
Attorney, Agent, or Firm—Warren N. Low; Renee S. Rutkowski

[57] ABSTRACT

A three-wheel golf bag cart is shown which includes power means centrally slung thereunder for maximum stability of the cart, and wherein the power means does not impede cart folding for transport and storage. A flexible elongated control cable to a hand-held control permits the golfer to effect off-on or multiple forward speed control while still retaining the ability to manually guide the cart, both by the cart handle and by tension on the control cable.

8 Claims, 5 Drawing Figures

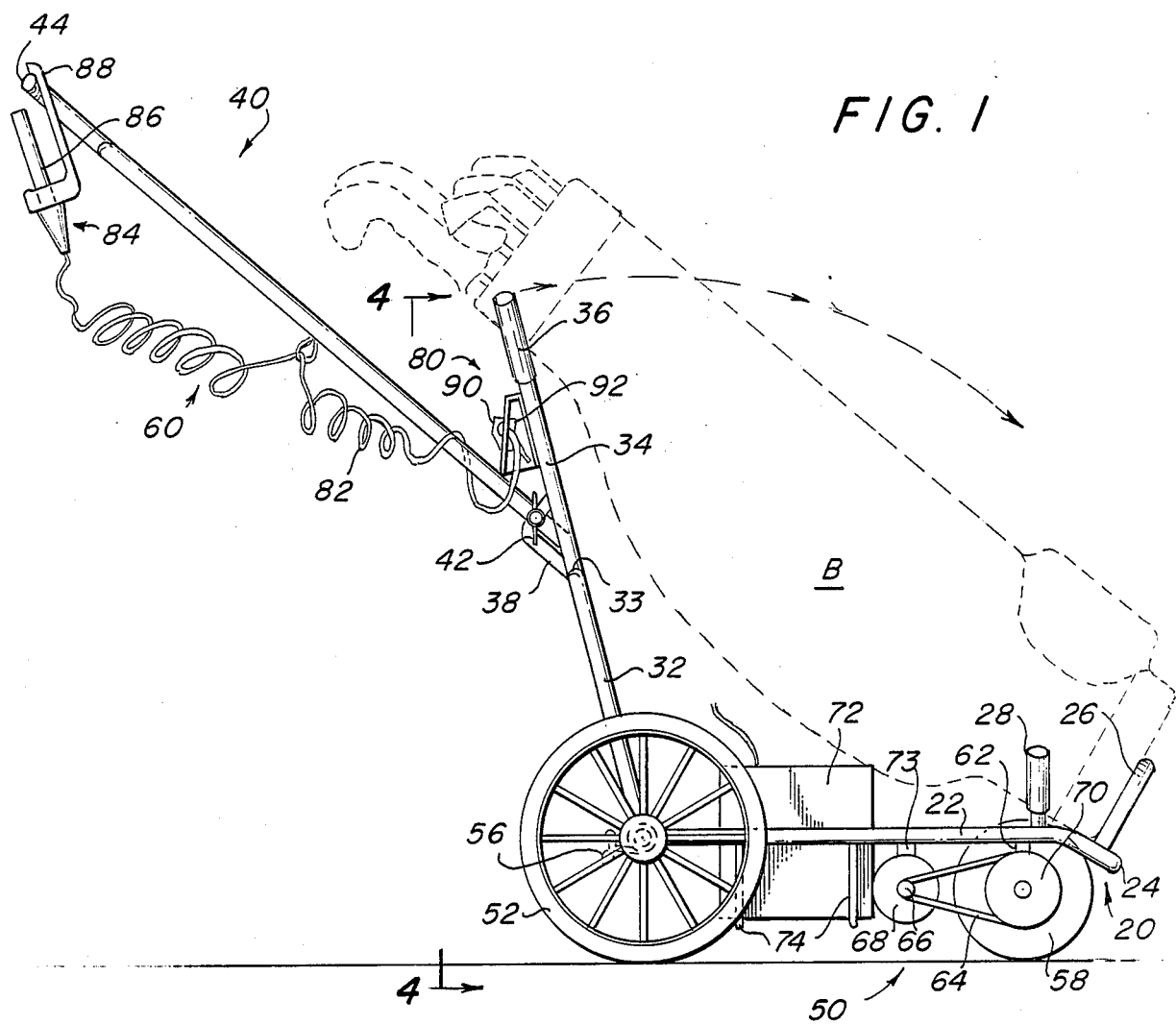
FIG. 1
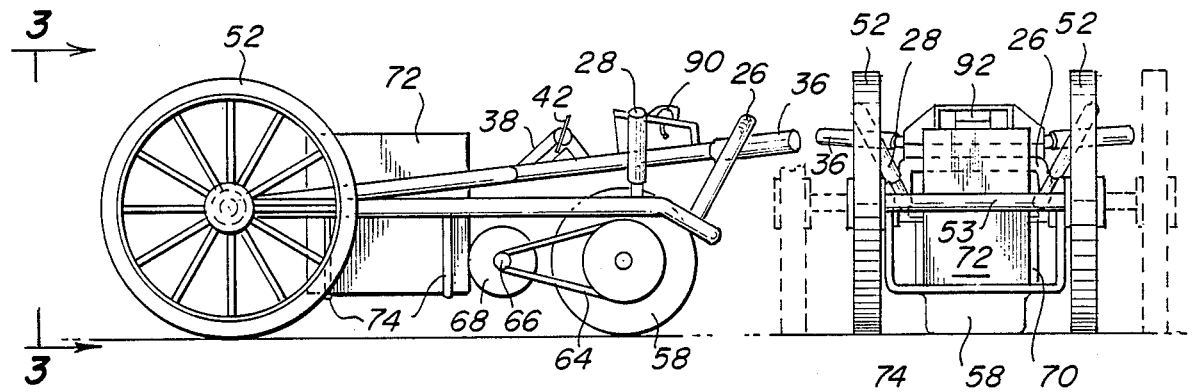
FIG. 2
FIG. 3

4,570,731

CONTROLLABLE GOLF BAG CART

BACKGROUND OF THE INVENTION

The two or three-wheeled golf bag cart has been a most useful accessory for the golfer to relieve the player of the burden of transporting a rather heavy golf bag and set of clubs therein as well as the weight of adjuncts and accessories as umbrellas, golf ball retrievers, etc.

In conjunction therewith numerous efforts have been made to provide satisfactory power means for propelling the golf bag carts, thereby to lessen the fatigue on the player, as even with a wheeled golf bag cart, a substantial burden is encountered on uneven terrain or up sloped areas of the fairway or approaches to greens, for example.

Numerous efforts have been made to provide an economical and effective golf bag cart as is evident from many U.S. patents, illustratively U.S. Pat. Nos. 3,812,929 to Farque or 3,472,333 to Lowenstern, among many others. Further, a number of such powered golf bag carts are available on the market from golfing supply houses, pro shops and the like.

While numerous ingenious features have been developed and provided on such prior art constructions, the same have frequently resulted in inordinately complex constructions utilizing remote control concepts, unreliable steering mechanisms, etc. and wherein further many of these powered golf bag cart constructions represent expensive, unbalanced, and unwieldly devices in actual use on the golf course.

Further, while known constructions may have merit as inexpensive golf bag carts for pro shop rental and storage of the carts at the golf course, the same have been incapable of ready folding for compact storage or transport by automobile by an individual owner, or required personal attention for attachment or detachment of a separate wheeled power element, for example, from a separate wheeled golf bag cart, all resulting in unwanted inconvenience to the golfer who is desirous of focusing his abilities and energies on the enjoyable game to be played and not on the complexities of mechanical equipment.

SUMMARY OF THE INVENTION

The instant invention effects a step forward in the art of powered golf bag carts in providing a structure of maximum simplicity and reliability while yet preserving the advantages of a well-balanced cart including the load of the golf club bag thereon and the additional load of the power, energy, and control components.

Further, the golf cart of the invention is capable of being compactly folded to minimum size notwithstanding the provision of power means, thereby to facilitate transport or storage when not in use on the links.

Yet further, the golf bag cart of the instant invention remains under ready light finger control of the player for a ready change in direction in usual manual manner, but when desired, the player may through a flexible control connection not only permit the cart to be self-powered as the player walks along the course but also effect steering guidance through the control connection. Further, both multi-speed and single speed power means are disclosed.

The golf cart of the instant invention has been in actual use for a brief period of time by numerous golfers and is found to provide highly desirable attributes of control, balance, and utility as aforesaid.

BRIEF DESCRIPTION OF THE DRAWINGS

The invention will be better understood taken in connection with the accompanying drawings in which:

FIG. 1 is a side elevational view of the golf bag cart of the invention, showing the golf bag in phantom lines;

FIG. 2 is a side elevational view of the golf bag cart of the invention in primary collapsed position for storage or transport;

FIG. 3 is a rear elevational view of the folded cart of FIG. 2, showing in phantom lines the normal extended position of the main wheels;

DESCRIPTION OF THE PREFERRED EMBODIMENT

Figure 4:
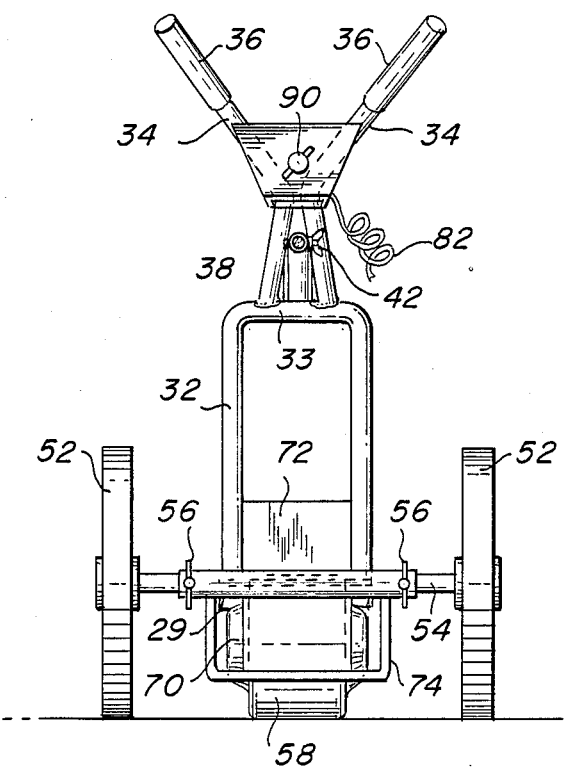
FIG. 4 is front elevational view of the golf cart as seen in FIG. 1, absent the bag thereon and with the handle shown only fragmentarily.

The instant golf bag cart 10 as seen in the drawings includes a lower chassis portion 20, an upstanding rear bag support 30 pivoted thereto, and handle 40 detachably secured to support 30, all of generally known construction.

The lower chassis 20 further includes power and motor means at 50 while a control means therefor at 60 includes a manual control handle assembly.

More particularly, the lower frame or chassis portion 20 of the cart includes laterally spaced side members 22 of tubular steel and the like and which are interconnected at their rearward ends by a transverse portion 24. Preferably the side rails 22 are angled slightly rearwardly as seen in FIG. 1 at their forward ends thereby to conveniently receive an upstanding U-shaped bag stop and handle element 26 upon which the bottom of the golf bag B rests as seen in FIG. 1, and wherein further the side rails 22 include generally conventional upstanding and diverging members 28 for lightly engaging the sides of the lower portion of the golf bag B to prevent untoward lateral shifting movement thereof. As a consequence, the lower portion of the bag is securely received on the chassis portion of the golf bag cart while yet being readily removable therefrom. The side elements 28 are preferably provided with a protective or cushioning material so as to prevent unwanted marring of the golf bag as the same jostles thereagainst in the ordinary operation of the cart.

Pivotally secured to the lower frame 22 in conventional manner as by pivot mountings 29 is the upstanding bag support structure at 30 and which includes a bifurcated, generally U-shaped member 32 extending upwardly and forwardly from the lower chassis 20, and to the upper crossbar 33 of which are secured the upstanding and generally diverging bag support arms 34. As with the lower bag support and retaining arms 28, the arms 34 are provided with suitable protective or cushioning means as at 36. Further, in known manner, the upper bag support assembly 30 has associated therewith bracket means at 38 defining a sleeve within which the upwardly and forwardly extending handle 40 is telescopingly and detachably received. Thus, the handle 40 terminates at its lower end in a length of tubing received within a socket carried by the bracket 38 and wherein means such as a wing nut 42 may be employed to detachably clamp the handle 40 to the bracket 38. At its upper end, the handle 40 partakes of a desirable configuration for ready use by the golfer, as in the nature of a generally laterally extending or C-shaped handle 44 with usual cushioning thereon as is conventional in the art.

With reference to the main wheels at 52, the same are conventionally associated with a transverse tubular member 53 of the lower chassis 22 wherein stub axles 54 associated with the wheels rollably connected thereto are received within the tubular member 53 and detachably clamped therein as by wing nut clamping means 56. The wheels 52 include a conventional freely rotatable connection to the stub axles 54, and it will be seen that upon release of the clamp nuts 56, the wheel and stub axles 52, 54 may be laterally telescoped toward each other as seen in FIG. 3 or may be pulled outwardly and removed, as desired, thereby rendering the golf cart more compact for storage or transport. In use, the wheels are preferably extended as shown in phantom lines to provide a broader base of stability for the rather substantial overhead weight of a full golf bag.

The single rear and drive wheel 58 is disposed substantially centrally of the lower chassis frame at 22 and is supported for rotation thereon by means of conventional strap brackets 62 which may be welded to the lower chassis at 22 and extend downwardly therefrom one on each side thereof, within which are received stub axles of the wheel 58 in conventional manner. The wheel 58 has associated therewith at one lateral side thereof, as for example the right side as seen in FIG. 1, a large sprocket or pulley (not shown) over whch is trained a drive chain or belt 64 extending forwardly to the drive shaft 66 of an electric motor 68.

So as to minimize interference of long grass, weeds, or other impedimenta in the rough of a golf course, large generally concavo-convex shields 70 are secured as by axle bolts to opposite sides of the wheel and serve as hubcaps for the front wheel 58 to deflect weeds and detritus from the area of the axle and especially from the drive sprocket.

As aforementioned, electric motor 68 through its drive shaft and sprocket effect propulsion of the ground wheel 58 wherein the drive motor is supported and mounted on the lower chassis 22 as by welded straps 73 depending therefrom on either side thereof.

Also forming part of the power and drive assembly 50 is an electric storage battery 72 preferably of the sealed and gel-filled type thereby to minimize likelihood of injury to the cart operator. The battery is a conventional rechargeable battery, one such battery being marketed under the trademark "Power Sonic" and rated at 12 volts, 24 amps.

Uniquely, the instant golf cart provides a pair of spaced U-shaped straps 74, 74 welded to the lower chassis 22, the straps depending therefrom on either side thereof to form a cradle within which the battery 72 is received as well seen in FIGS. 1 and 3.

Several advantages are achieved by this construction. Thus, the battery which is relatively heavy is supported at a low point on the golf cart, thereby lowering the center of gravity with respect to the substantial overhead bulk and weight of the golf clubs. The electric motor 68 slung below the frame also contributes in this regard. Further, both the battery and the electric motor are disposed beneath the lower chassis 22 and between the large wheels 52 and the drive wheel 58, thereby enhancing the safety aspect of the cart by minimizing accidental access to or contact with either the electric battery or the motor in ordinary usage of the cart. Nonetheless, the battery may be readily removed from the cart when a golf bag is not present thereon by virtue of its positioning in the U-shaped support brackets and from the battery may be removed by upward movement after appropriate disconnection of control and motor leads.

Further, it should be noted that the battery is supported by the U-shaped bracket 74 centrally of the lower chassis between rails 22, 22 and also with respect to the bifurcated U-shaped portion 32 of the bag support that when the latter is folded downwardly to the collapsed FIG. 2 position, it will be seen that the bag support 30 clears the battery which projects slightly therethrough and thereby does not impede the maximum collapsing character of the bag cart.

With reference to the control system 60 for the motor and battery assembly 50, in the illustrated form of the invention leads extend from the battery to a switch panel 80 conveniently positioned for the golfers access at a point on the bag support 32 adjacent the bag side support legs 34, as by clamping bolts or welding. From the motor control or switch assembly at 80, appropriate elongated flexible leads extend to the operators control handle 84. Preferably the leads are formed into a precoiled length of control cable 82. In the illustrated embodiment of the invention, the control panel 80 includes a switch and rheostat assembly providing two speeds for the electric motor 68, a relatively higher and a relatively lower speed.

The control handle assembly 84 inclues a handle or grip portion 86 and a trigger-like lever 88, elements themselves well known in the art, and the golfer readily manually grasps the control handle assembly 84 and squeezes the lever 88 to close the switch in the handle assembly and suitably energize the motor 68 to propel the cart forwardly. In the form of the invention illustrated, a two-speed control is provided whereby upon deflection of lever 88 a first speed is attained and upon closing of a switch 120 on grip 86 a second speed is attained, as may be convenient to the golfer.

The control panel at 80 includes a knob 90 which may be associated with a variable resistance or rheostat element 92 thereby to initially set as may be convenient to the golfer a desired level of speed as a function of power from the battery to the motor. Should the golfer find that a selected speed is somewhat too high or too low for personal or terrain conditions, quick adjustment of the knob 90 will permit a slight relative increase or decrease in the selectable speeds.

Figure 5:
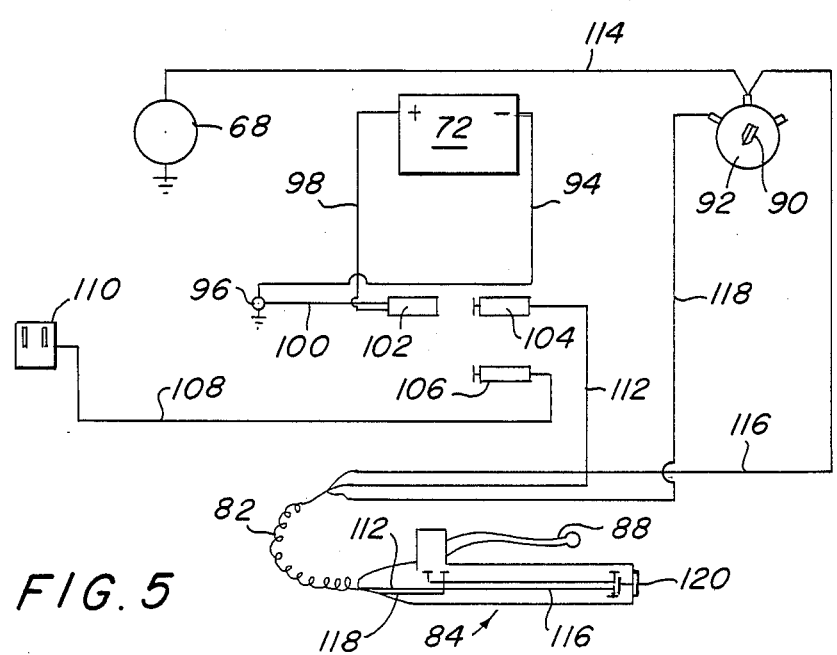
FIG. 5 is a diagrammatic illustration of the electric control circuit for the golf bag cart.

The power system for the motor is generally conventional and diagrammatically illustrated in FIG. 5. Thus, conveniently, a ground lead 94 will extend from one side of the battery 72 to a suitable grounding point 96 on the metallic frame of the golf cart which may be readily provided by a nut and bolt connector. The positive lead from the battery at 98 and the ground lead 100 extend into a conventional socket 102 located at a convenient point on the golf cart frame, preferably near the battery 72.

The conventionally separable socket 102 may receive either of the plug elements 104, 106 and thus permits the ready connection of either the motor control system to the battery power with plug 104 or a battery charging circuit at 108 between plug 106 and a suitable AC outlet charge adapter 110 as is known in the art.

The plug 104 communicates with the motor control system as noted, and includes a lead 112 extending from the plug 104 into the three-conductor coil cable 82 to the control handle assembly 84. In like manner, a lead extends from the windings of motor 68 at 114 to the variable resistance element 92 and thence at 116 into the conductor cable 82, while a third lead 118 extends from the variable resistance 92 also into the cable 82. The other lead from the motor may be grounded as at 96. The electric leads from plug 104 near the battery may be clamped to or fed through the framework tubing.

In the control handle assembly, the respective leads from the motor at 116 and the lead 112 direct from the battery may be connected at a push button switch 120 on grip 86 thereby to provide the greater power and therefore a higher effective speed to motor 68 and the ground wheel 58. This high speed may be a function of the setting of the variable resistance control knob 90, or may be a direct full-power connection. The lower speed is selected by depressing the lever 88 thereby connecting the battery lead 112 to the low-speed line 118 connected back through the variable resistance 92 to the motor.

The illustrated construction is exemplary and may be varied as desired depending upon a particular application, or motor or battery used, as is well known in motor control system art.

The control handle assembly 84 by virtue of the handle portion 86 and the lever 88 is essentially bifurcated and may be readily hooked over the pull handle 44 of the cart if desired when not in use. Similarly, in view of the length and spring-like nature of coiled cable 82, a convenient hook 122 on handle 40 may provide support for the cable.

While a two-speed motor control system is shown, including means to effect an adjustment of the power available by means of variable resistance 92, a substantial simplification of the wiring circuit can be provided by eliminating the two-speed arrangement, and permitting only an on-off motor control in a single speed motor control system, thereby eliminating one lead in the control handle assembly 84 and associated wiring.

In use by the golfer, then, it will be seen that the golf bag cart may be pulled by its handle 44 in usual manner wherein a slight rocking of the handle assembly 40 in counterclockwise direction as seen in FIG. 1 elevates the ground wheel 58 and permits ready pulling and or turning of the cart by the golfer for desired positioning.

Whenever convenient, however, and with the cart pointed in the essentially desired direction, the golfer may release the handle assembly 40 entirely and grasp only the motor control handle unit 84 in his hand which is connected to the cart through the flexible coiled cable 82. Upon selection of either one of the two speeds in the two-speed version, or by mere closing of the single switch in the single speed version, by appropriate gripping of the control handle 84, it will be seen that power will be provided to motor 68 thereby to propel the cart along the course without direct exertion thereon by the golfer. Should on a generally downwardly inclined slope the ground speed of the cart increase to an undesirable extent, the same may be switched either to the low speed position or to the motor-off position whereby the drive wheel will exert some relative retarding or braking effect on progress of the cart. At any time of course the cart may be grasped manually.

Further, and importantly, it will be seen that the point of connection of the flexible cable 82 is at a relatively high location on bag support element 30, whereby as the cart is being self-propelled, the golfer may tug slightly as necessary on the cable connection 82 to urge the cart to turn in one direction or another in accordance with the direction of pull. In this manner, it is not necessary for the golfer to manually turn the cart at any time except for major or rapid changes in direction.

It will be seen, therefore, that the instant assembly provides the highly desirable self-powered aspect of a golf bag cart with minimum complexity, whereby a golf bag cart according to the present invention may be fabricated at relatively minimum cost, or, indeed, existing carts may be modified to incorporate the inventive features herein. Further, while complexities of steering mechanisms are avoided, the provision of the elongated coil cable control for the motor permits steering influences to be exerted upon the cart when it is not necessary to manually grasp the same.

While I have set forth the best mode of my invention known to met at the present time, it is evident that variations and alterations may be made therein within the spirit of the teachings herein and within the scope of the appended claims defining the same.

What I claim is:

1. In a motorized golf bag cart having a pair of main wheels on a common axis and a third stabilizing wheel on an axis parallel thereto and spaced therefrom, and having a frame for receiving thereon a golf bag, and further including motor means drivably connected to a said wheel, power means for said motor, and control means accessible to the cart operator for controlling power to the motor and thereby operation of the cart, the improvement therein comprising
   said frame having articulated components including a lower portion thereof and an upstanding bag support thereof,
   said frame lower portion being defined by a laterally spaced pair of side rails with means mounting said power means therebetween whereby said power means includes portions disposed below said frame lower portion, thereby to lower the center of gravity of said cart,
   said upstanding bag support having means pivotally connecting the same to said lower frame portion to fold thereover and collapsing said cart, said bag support including a bifurcated portion thereof disposed in straddling relation to said power means when said bag support is in folded relation to said lower frame portion in fully collapsed condition.

2. The improved golf bag cart of claim 1 wherein said power means is a multi-cell electric battery.

3. The improved golf bag cart of claim 2 wherein said motor means is an electric motor, and said motor is mounted on said frame in a position disposed between said wheel axes.

4. The improved golf bag cart of claim 1 wherein said control means includes a hand-operable switch, and elongated flexible connector means extending between said handle and a point on said frame, and further including connection means between said power means and said point on said frame, whereby the operator may utilize the said control means from a position spaced from and out of manual contact with said golf cart.

5. The improved golf bag cart of claim 4 wherein said control means further includes preset adjustable speed means for said motor means.

6. The improved golf bag of claim 5 wherein said control means further includes two-speed positions selectively actuatable by an operator at said control means for attaining either a first or second speed of operation of the cart.

7. The golf bag cart of claim 4 wherein said flexible connector means is connected to said golf cart frame at a said point disposed forwardly on said cart and substantially in the central longitudinal plane of said cart, thereby to permit guiding of the cart to alter the direction thereof by towing laterally on said flexible connector means.

8. The golf bag cart of claim 3 further including drive belt and pulley means extending between said motor and said drivable wheel, and, grass-deflecting hubcap means associated with said drivable wheel and said pulley means to prevent fouling of said pulley means.

* * * * *